United States Patent
Marquis

(10) Patent No.: US 8,188,630 B2
(45) Date of Patent: May 29, 2012

(54) MAGNETIC AMPLIFIER

(76) Inventor: Guillaume Marquis, Montreal (CA)

( * ) Notice: Subject to any disclaimer, the term of this patent is extended or adjusted under 35 U.S.C. 154(b) by 323 days.

(21) Appl. No.: 12/684,967

(22) Filed: Jan. 10, 2010

(65) Prior Publication Data

US 2010/0187930 A1    Jul. 29, 2010

(30) Foreign Application Priority Data

Jan. 24, 2009   (GB) ................................. 0901122.2

(51) Int. Cl.
*H02K 53/00* (2006.01)
(52) U.S. Cl. .......... 310/113; 310/103; 310/152; 290/1 C
(58) Field of Classification Search .................. 310/152, 310/103
See application file for complete search history.

(56) References Cited

U.S. PATENT DOCUMENTS

| | | | |
|---|---|---|---|
| 2,243,555 A | 5/1941 | Faus | |
| 2,790,095 A | 4/1957 | Peek et al. | |
| 3,355,645 A | 11/1967 | Kawakami et al. | |
| 3,523,204 A * | 8/1970 | Rand | 310/94 |
| 3,671,756 A * | 6/1972 | Meier | 290/54 |
| 3,831,537 A | 8/1974 | Siegel | |
| 4,011,477 A | 3/1977 | Scholin | |
| 4,082,969 A | 4/1978 | Kelly | |
| 4,167,684 A | 9/1979 | Kelly | |
| 4,486,176 A | 12/1984 | Tardieu et al. | |
| 4,751,486 A | 6/1988 | Minato | |
| 5,514,923 A | 5/1996 | Gossler et al. | |
| 5,514,926 A | 5/1996 | Bushman | |
| 6,084,322 A | 7/2000 | Rounds | |
| 6,331,744 B1 | 12/2001 | Chen et al. | |
| 6,703,743 B2 | 3/2004 | Kaneko et al. | |
| 6,849,984 B2 | 2/2005 | Gallant | |
| 6,930,421 B2 | 8/2005 | Wise | |
| 6,998,723 B2 * | 2/2006 | Kong et al. | 290/1 C |
| 7,024,963 B2 * | 4/2006 | French | 74/665 F |
| 7,471,024 B2 * | 12/2008 | Park | 310/103 |

FOREIGN PATENT DOCUMENTS

| | | | |
|---|---|---|---|
| DE | 3332254 | * | 4/1985 |
| JP | 2-17879 | * | 1/1990 |
| JP | 9-47050 | * | 2/1997 |
| JP | 2005-94889 | * | 4/2005 |

* cited by examiner

*Primary Examiner* — Burton Mullins

(57) ABSTRACT

A Magnetic amplifier has a main disc having a plurality of permanent magnets embedded therein; an electric generator; a main disc shaft connected and passing through the center of the main disc and mechanically connected at an end thereof to the electric generator; at least one electric motor; an electric motor shaft mechanically connected to each of the at least one electric motor; an oblong permanent magnet attached to a distal end of each electric motor shaft opposite the end attached to the electric motor, wherein each of the oblong magnets are positioned in close proximity to the radial edge of the main disc to thereby interact with the permanent magnets of the main disc, wherein when the at least one electric motor rotates the respective oblong permanent magnets, the main disc is magnetically induced to rotate and thereby create electrical energy within the electric generator.

7 Claims, 14 Drawing Sheets

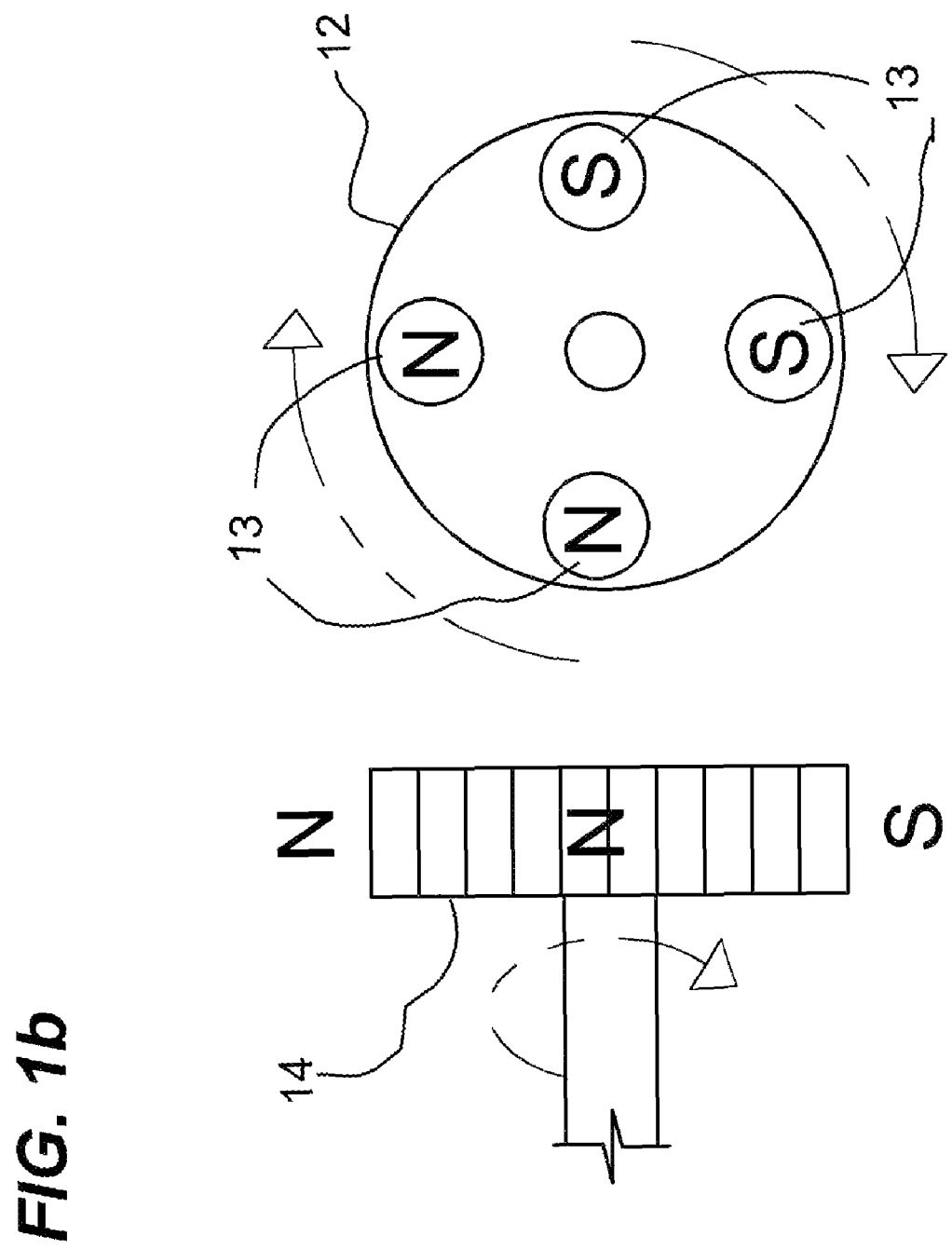

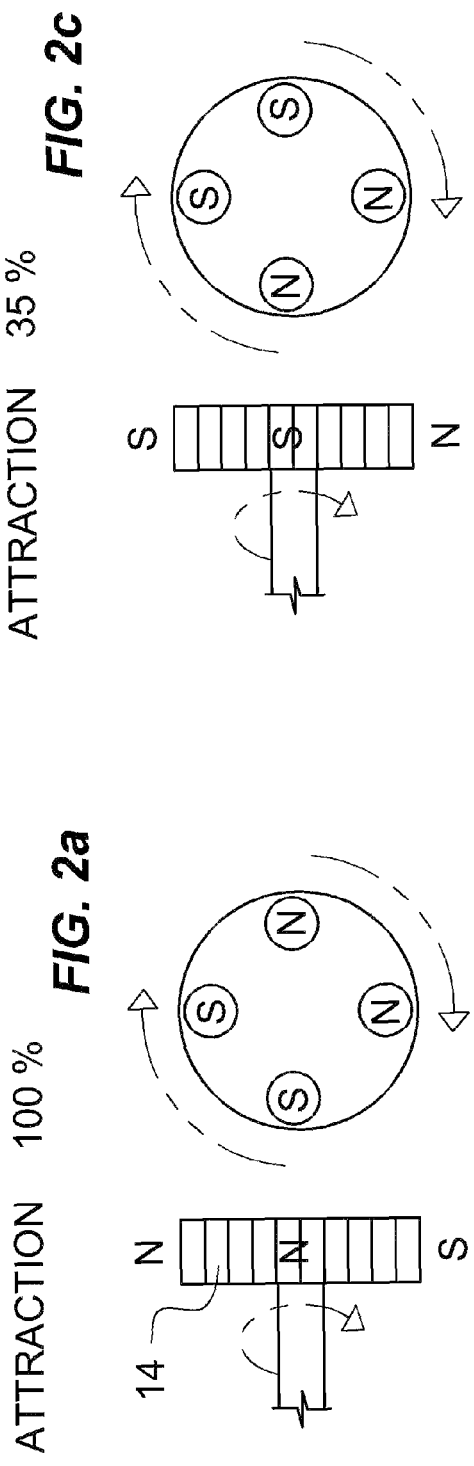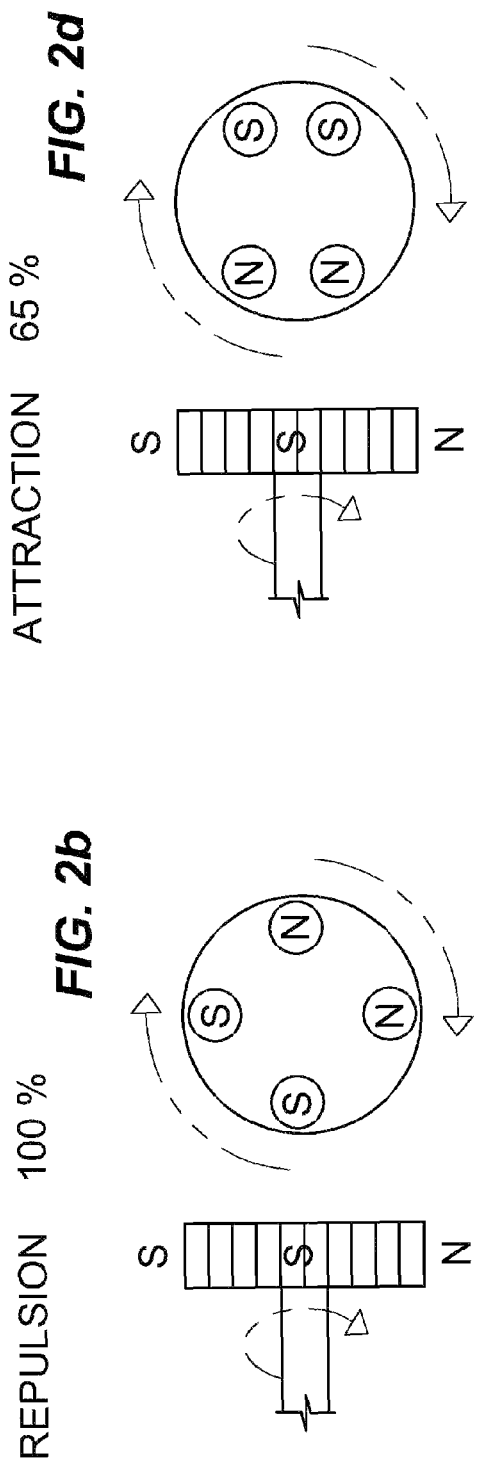

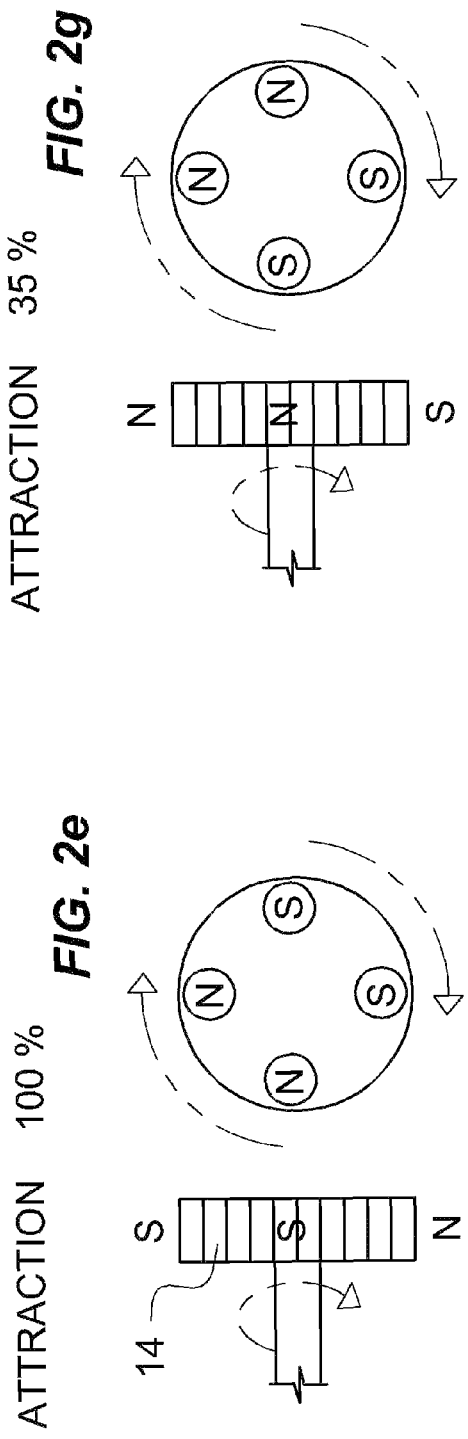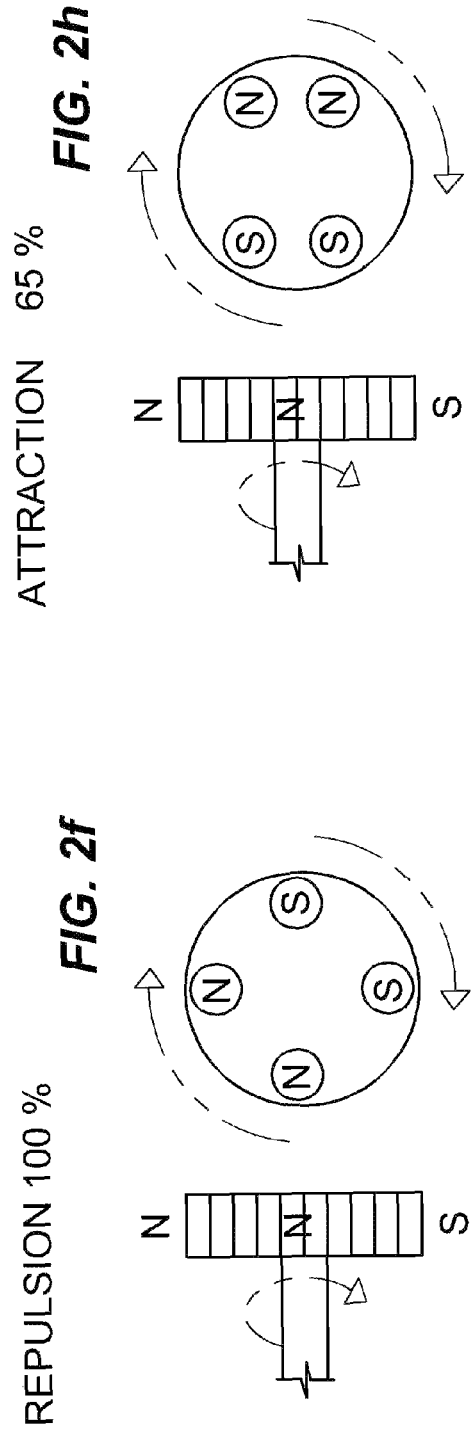

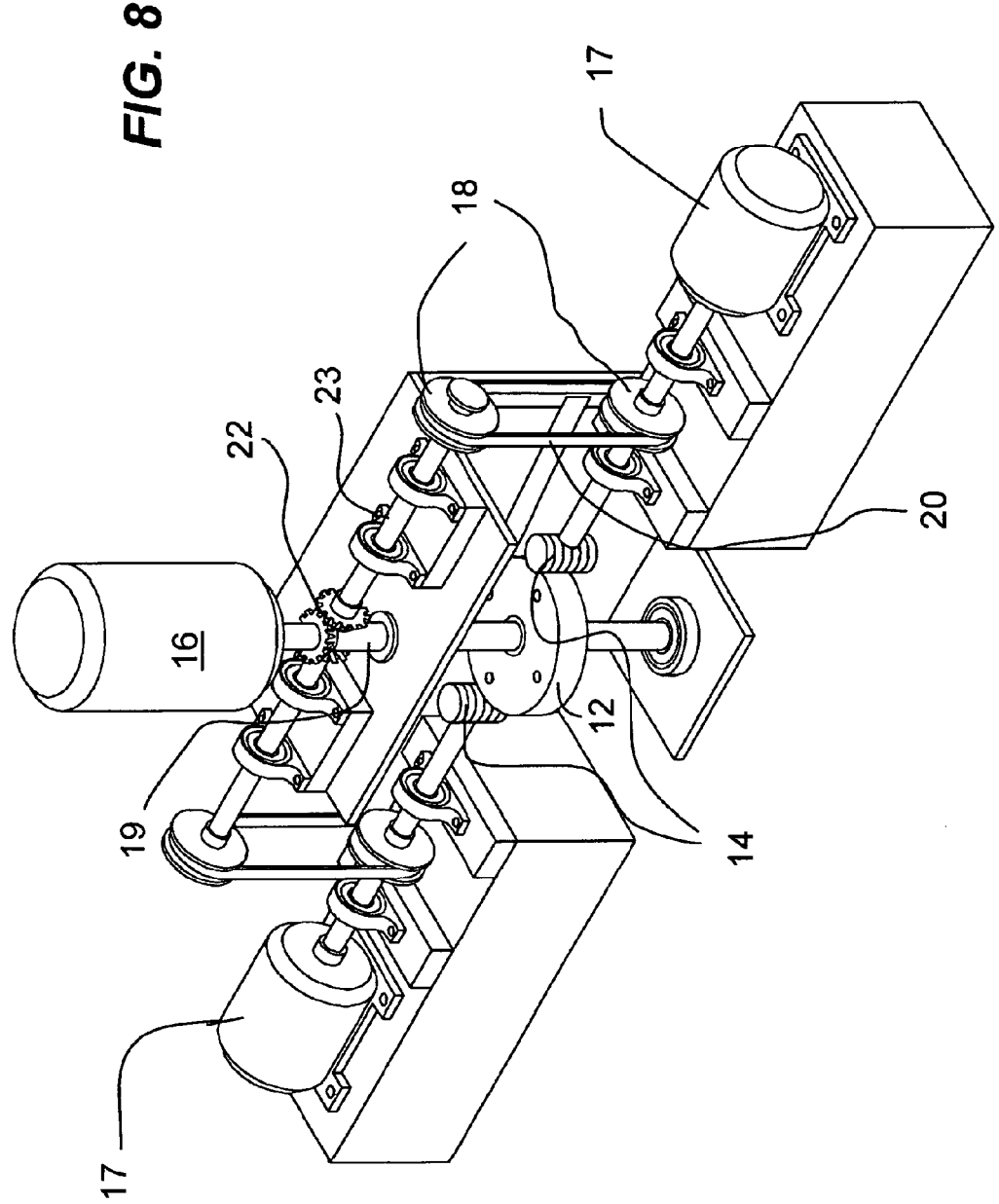

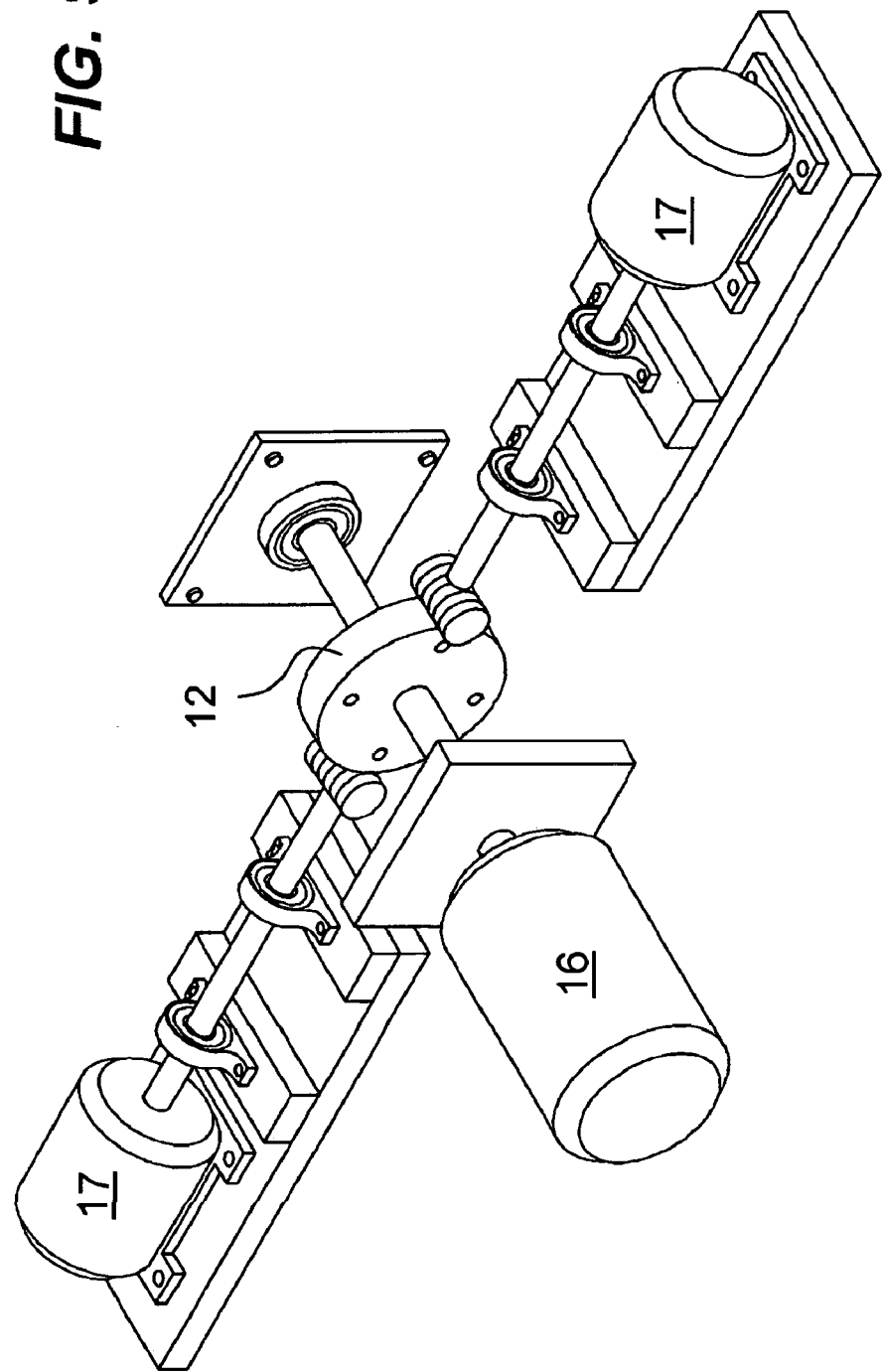

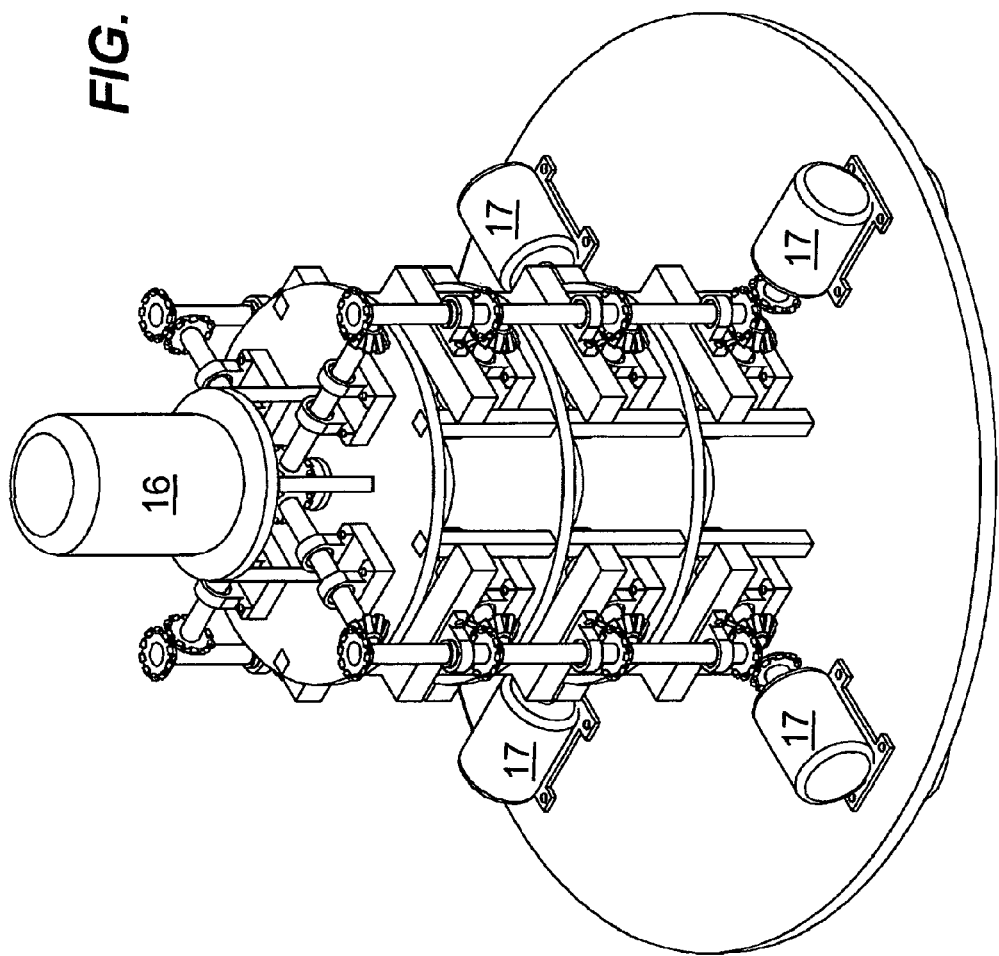

US 8,188,630 B2

MAGNETIC AMPLIFIER

This application claims priority based on grant of patent application GB0901122.2 filed Jan. 24, 2009

FIELD OF THE INVENTION

The present invention relates generally to motors but more particularly to a magnetic motor.

BACKGROUND OF THE INVENTION

Over the years, several variations of motors using magnetic forces have been developed. Each having their own characteristics and embodiment.

SUMMARY OF THE INVENTION

It is a main advantage of this invention to provide for a device which uses magnetic fields to induce motion to a second component the way gears or belts usually mechanically connect separate components. The advantages are that there is no loss due to heat and no wear of parts due to physical contact. Useful applications are for when the components need to be physically separate by a non metallic barrier. For example, one component is in an environment that is accessible whereas the other part is in a hostile or otherwise hard to reach environment. In such a case, only a transmission means not involving any mechanical contact can transfer power from one part to the other. Variations in embodiments depend upon the amount of power transfer necessary. In a preferred embodiment, a generator can produce electricity to actuate other components. In this manner, mechanical as well as electrical power can be transferred into the hostile environment.

In order to do so, the invention comprises a main disc having a plurality of permanent magnets embedded therein; an electric generator; a main disc shaft connected and passing through the center of the main disc and mechanically connected at an end thereof to the electric generator; at least one electric motor; an electric motor shaft mechanically connected to each of the at least one electric motor; an oblong permanent magnet attached to a distal end of each electric motor shaft opposite the end attached to the electric motor, wherein each of the oblong magnets are positioned in close proximity to the radial edge of the main disc to thereby interact with the permanent magnets of the main disc, wherein when the at least one electric motor rotates the respective oblong permanent magnets, the main disc is magnetically induced to rotate and thereby create electrical energy within the electric generator.

In a preferred embodiment, the main disc is formed from non-magnetizable material.

The non-magnetizable material is chosen from a list of non-magnetizable material including wood, and polymers.

In a preferred embodiment, the oblong permanent magnets are formed from a plurality of stacked magnets.

The permanent magnets of the main disc can be smaller, larger, or equal in size than the oblong permanent magnets.

The permanent magnets of the main disc consist of a set of permanent magnets having two alternating poles.

The permanent magnets of the main disc consist of a set of permanent magnets having four alternating poles.

In an alternate embodiment, there are four electric motors, four electric motor shafts, and four oblong permanent magnets around and interacting with the main disc.

In yet another alternate embodiment, there is a backup system including a beveled gear shaft for each the electric motor shaft; a beveled gear attached to an end of each of the beveled gear shafts; a beveled gear upon the main disc shaft in close proximity to the electric generator and adapted to mechanically interact with each beveled gear of each of the beveled gear shafts; a pulley concentric with and attached to each of the beveled gear shafts; a pulley concentric with and attached to each of the electric motor shafts; and a belt for each the electric motor shaft, each respective belt being frictionally connected between each respective beveled gear shaft pulley and electric motor shaft pulley, such that when the electric motors rotate, the respective belts, pulleys, and beveled gears rotate, thereby creating electrical energy within the electric generator.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 1b Top view of the oblong permanent magnet and the disc with its embedded permanent magnets.

FIGS. 2a-h Top views of a first embodiment showing all the cycles. One oblong permanent magnet and a disc with 4 permanent magnets FIGS. 3a-d Top views of a second embodiment. One oblong permanent magnet and one disc with 2 permanent magnets.

FIG. 5a Top view of an embodiment having two oblong permanent magnets and a disc with four permanent magnets.

FIG. 8 Isometric view of the invention as in FIG. 7 but with an additional set of pulleys and beveled gears.

FIG. 9 Isometric view of the invention but oriented horizontally instead of vertically.

FIGS. 10a-c Isometric, side and top views, respectively, of an embodiment of the invention stacked vertically.

DETAILED DESCRIPTION OF THE PREFERRED EMBODIMENT

Figure 1A:
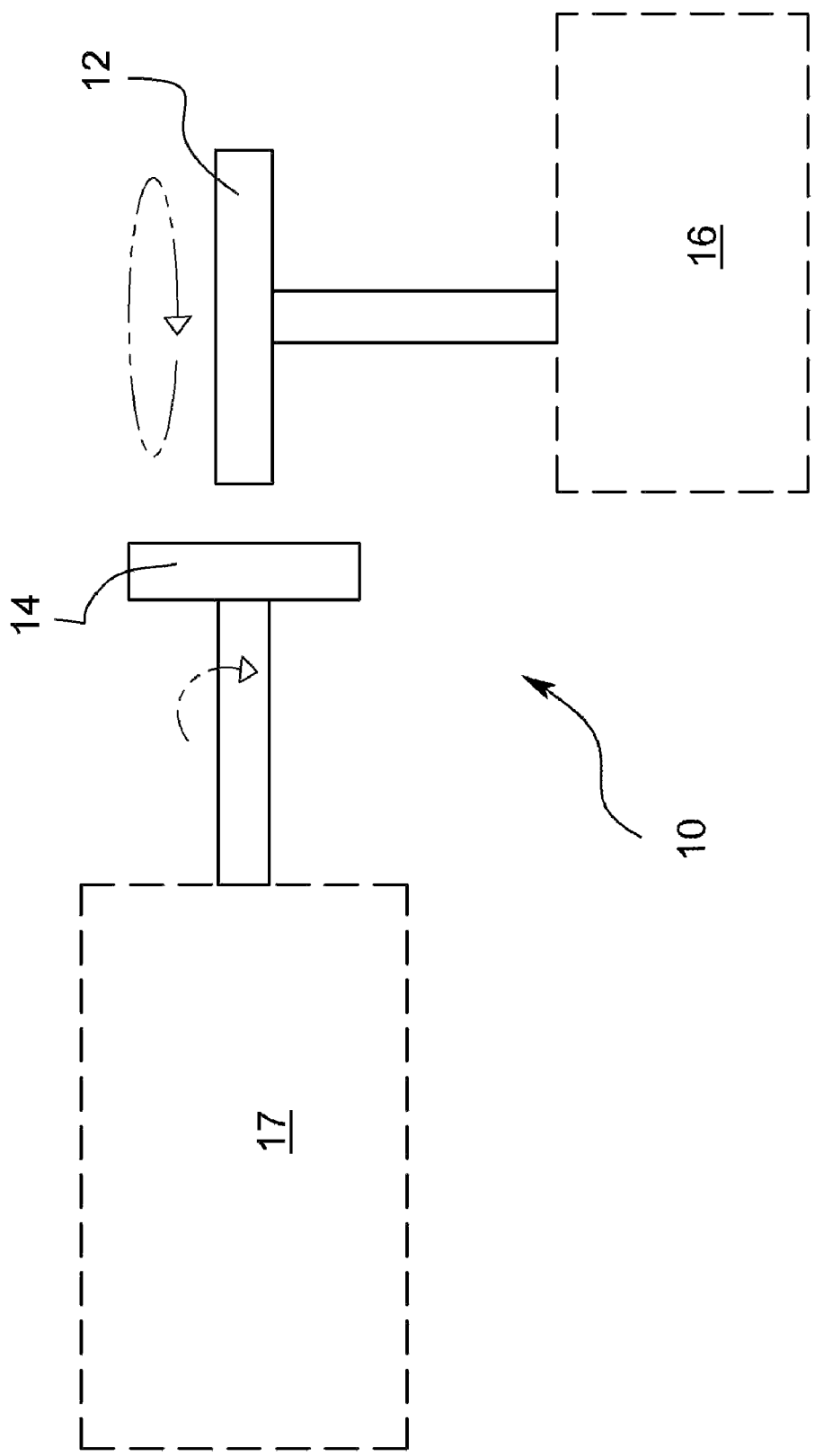
FIG. 1a Side view of the invention.
Figure 3A:
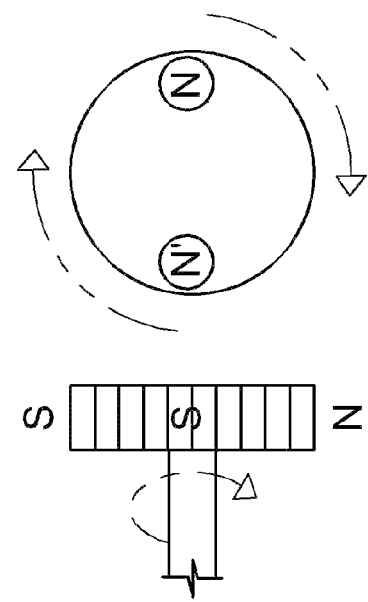
Figure 3B:
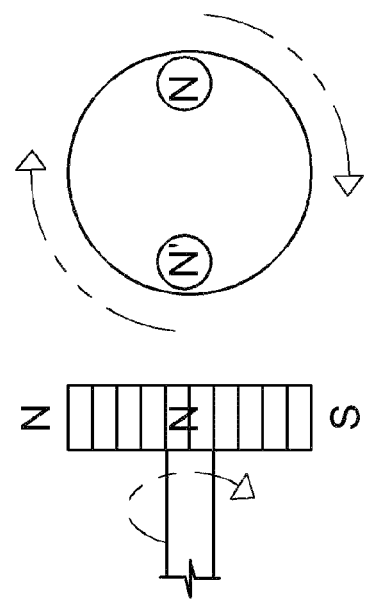
Figure 3C:
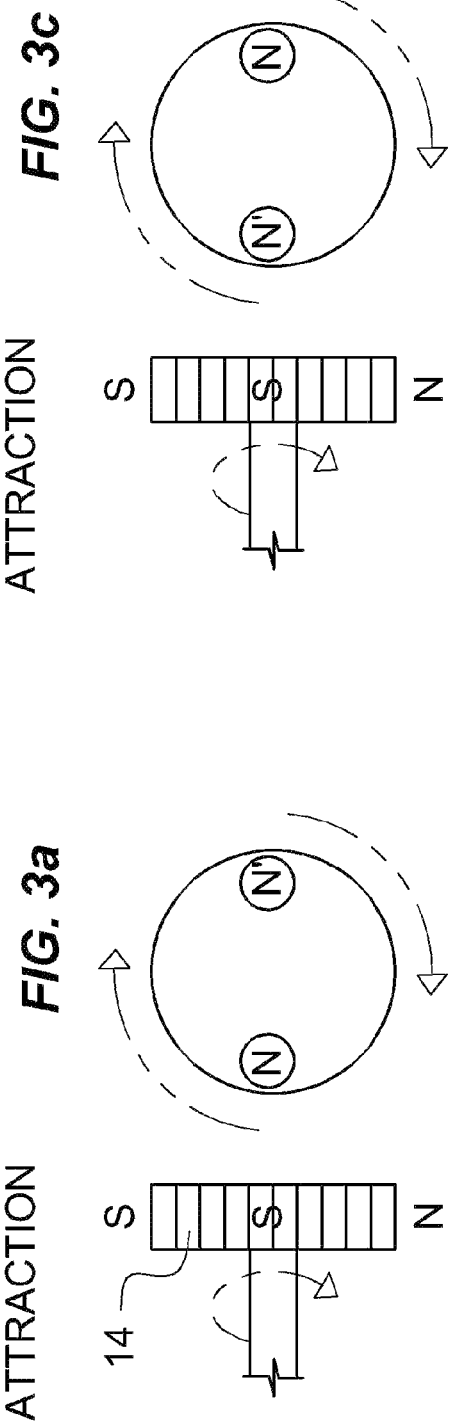
Figure 3D:
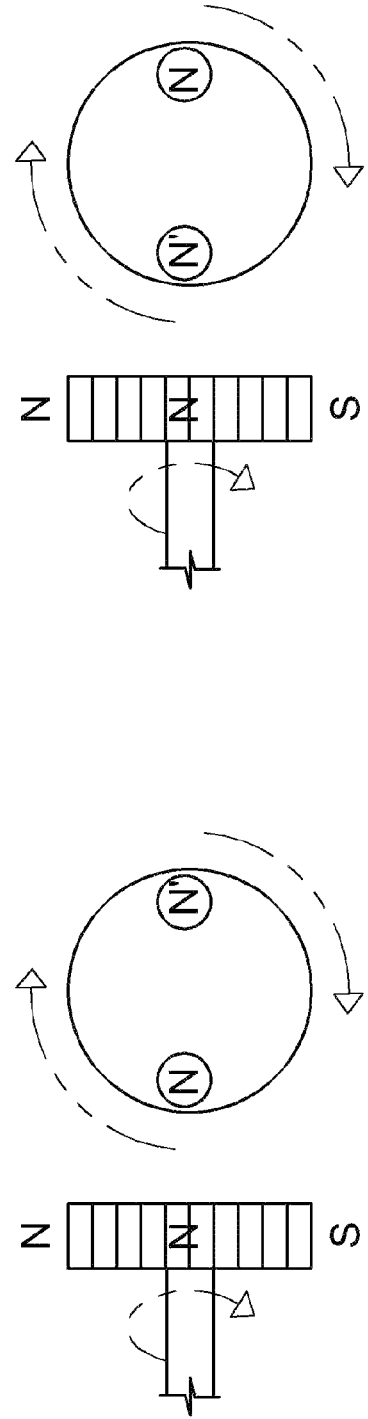

A magnetic amplifier (10) has a disc (12) made out of non-magnetizable material, such as wood or polymers, which has a plurality of permanent magnets (13) embedded therein, and an oblong permanent magnet (14), attached to a shaft (11) extending from an electric motor (17).

The oblong permanent magnet (14) can also be made from a plurality of small stacked magnets, as seen on FIG. 1b, for example.

An electric generator (16) is connected to the disc (12), by way of a disc shaft (19).

When the electric motor (17) rotates the oblong permanent magnet (14), it induces rotation to the disc (12).

FIG. 2 show the various sequence of attraction and repulsion of a set of permanent magnets (13) having four alternating poles.

FIG. 3 shows the sequence for an alternate embodiment having only one pair of poles per permanent magnets (13).

Figure 4A:
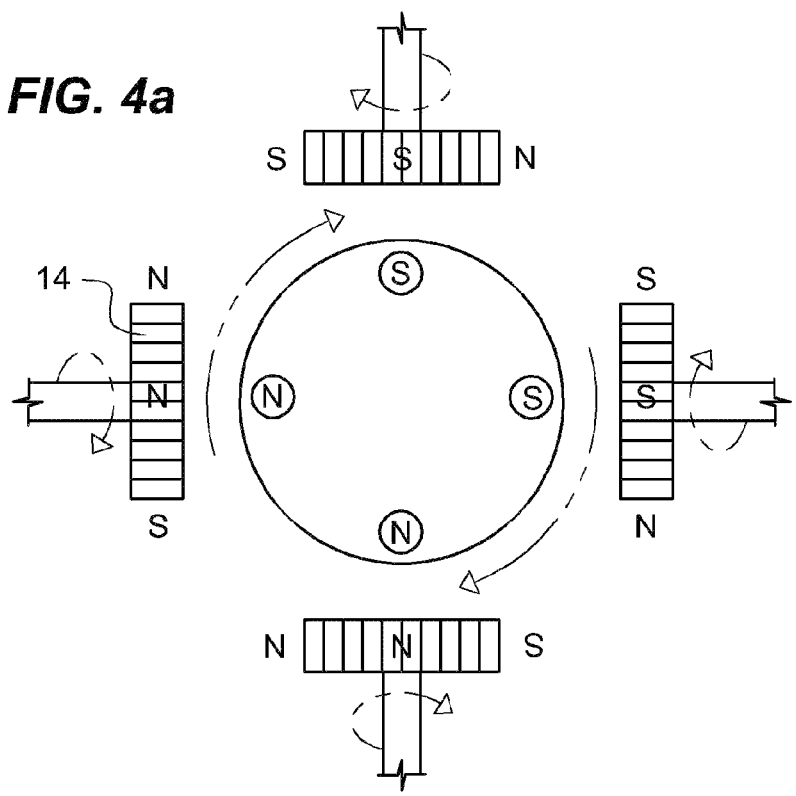
FIGS. 4a-b Front view of an embodiment having four oblong permanent magnets and a disc with 4 permanent magnets.
Figure 4B:
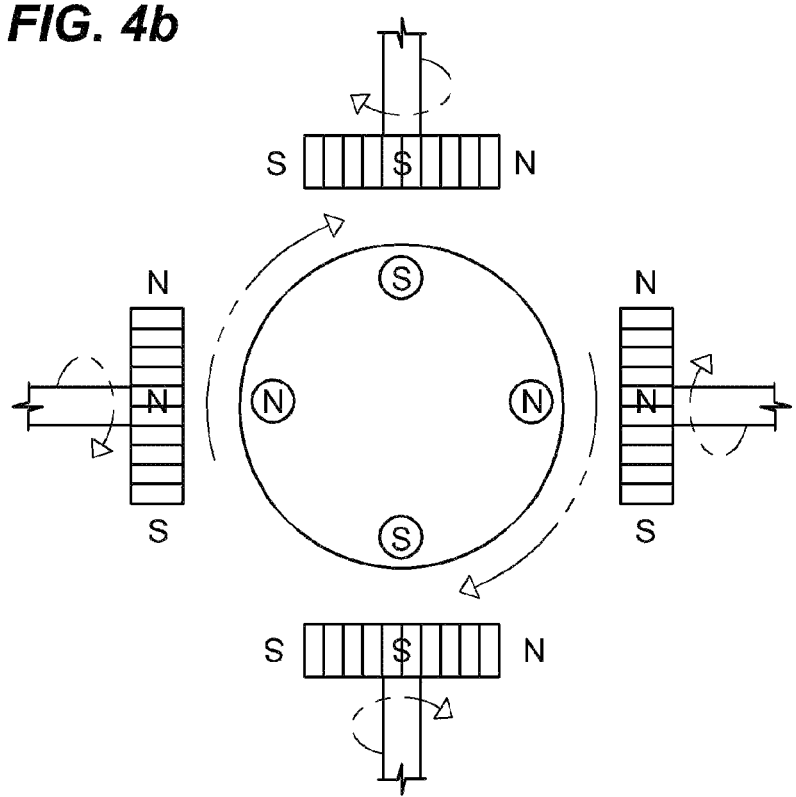
Figure 5C:
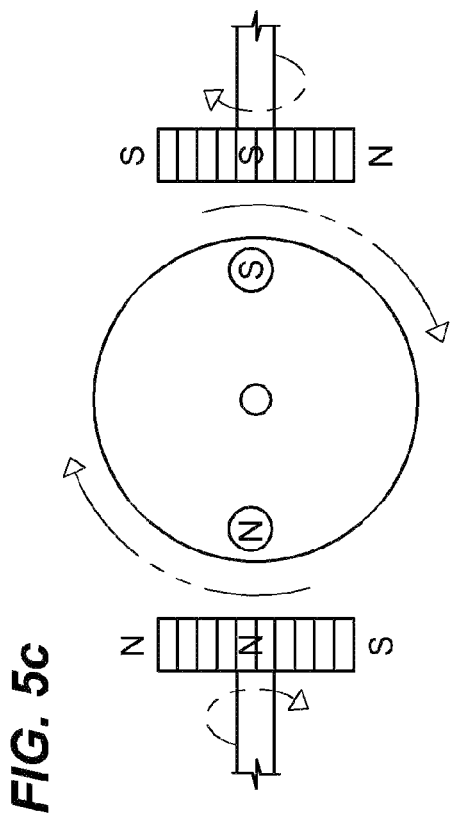
FIGS. 5b-c Top views of an embodiment having two oblong permanent magnets and a disc with two permanent magnets.
Figure 5A:
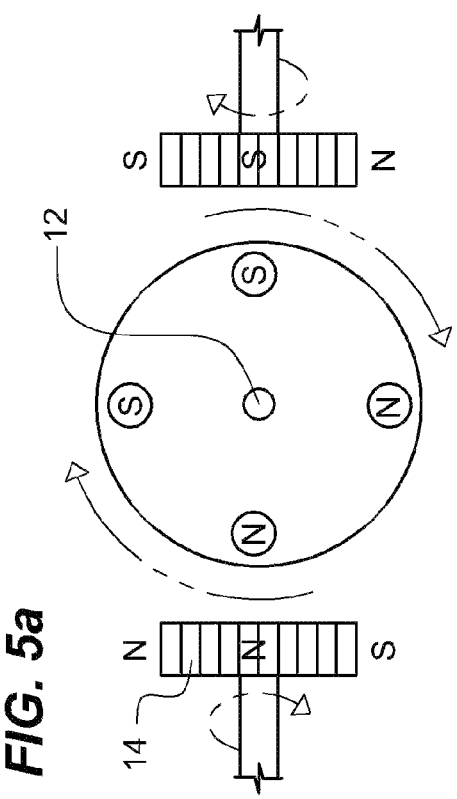
Figure 5B:
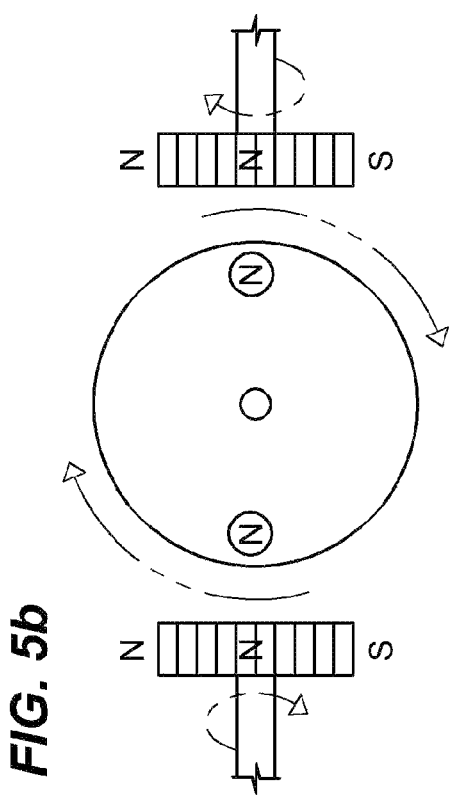
Figure 6B:
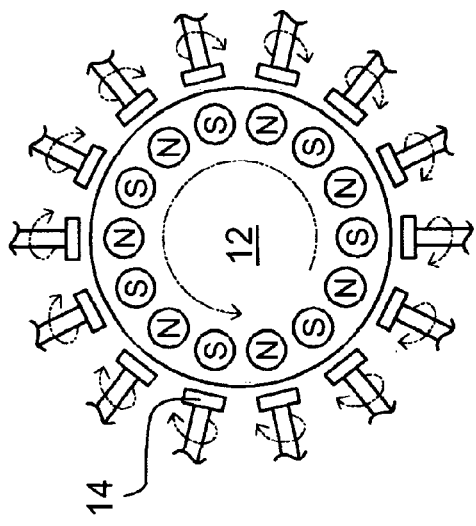
FIGS. 6a-c Top views of an embodiment having a plurality of oblong permanent magnets and a disc with a plurality of permanent magnets.
Figure 6C:
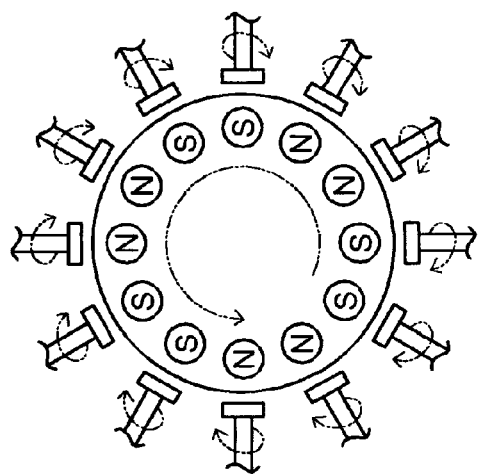
Figure 6A:
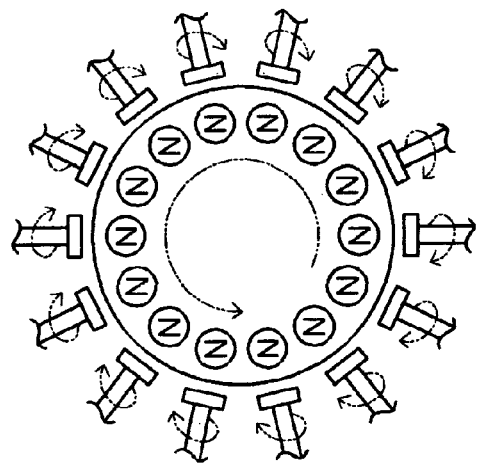
Figure 7:
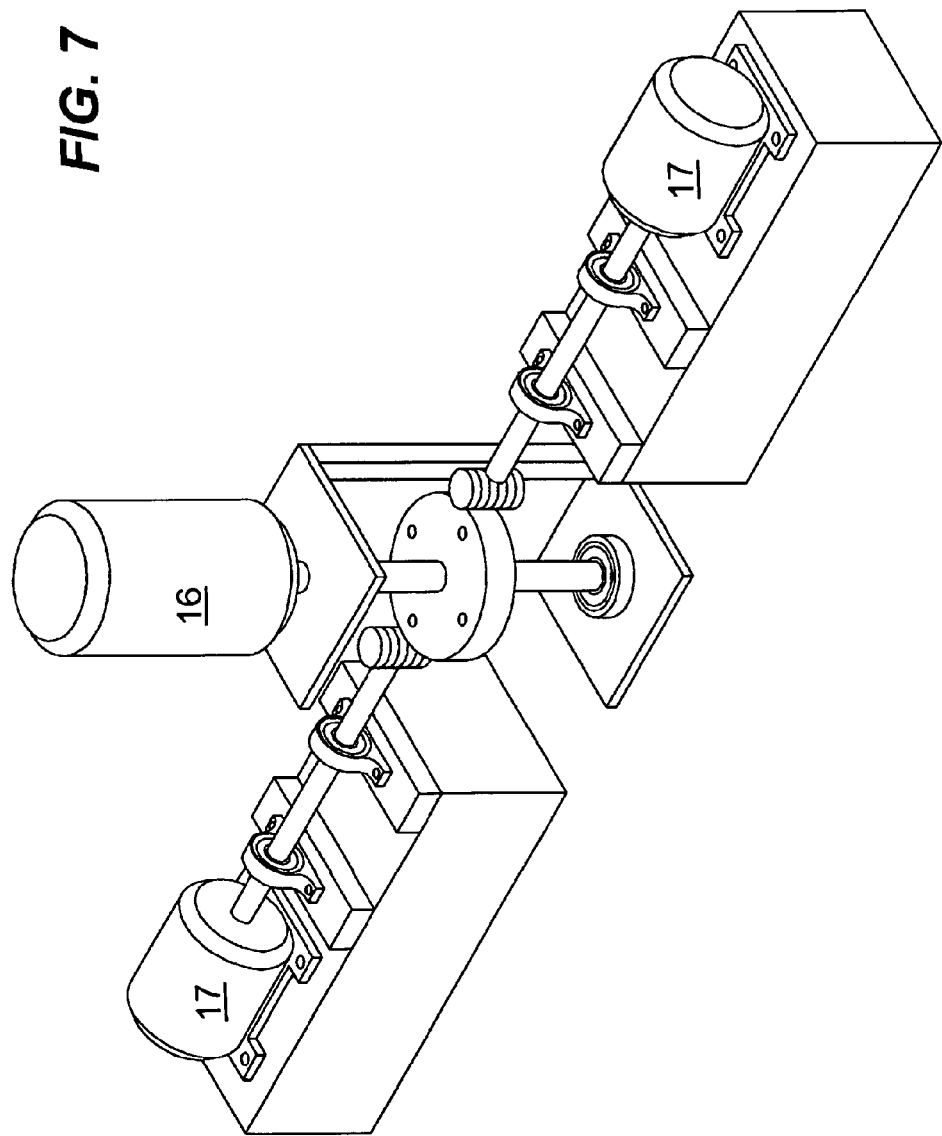
FIG. 7 Isometric view of the invention with two electric motors.

FIG. 4 shows four oblong permanent magnet (14) around one disc (12), and FIGS. 5-6 show other possible variations showing that there can be a plurality of oblong permanent magnets (14) around one disc (12). The relative sizes between the oblong permanent magnets (14) and the permanent magnets (13) is variable (equal, larger, smaller).

FIG. 8 shows an embodiment wherein a backup system of a pair of pulleys (18) actuated by a belt (20) wherein one of the pulleys (18), connects to a beveled gear shaft (23), which connects to a beveled gear (22) which connects to the disc shaft (19).

Figure 10B:
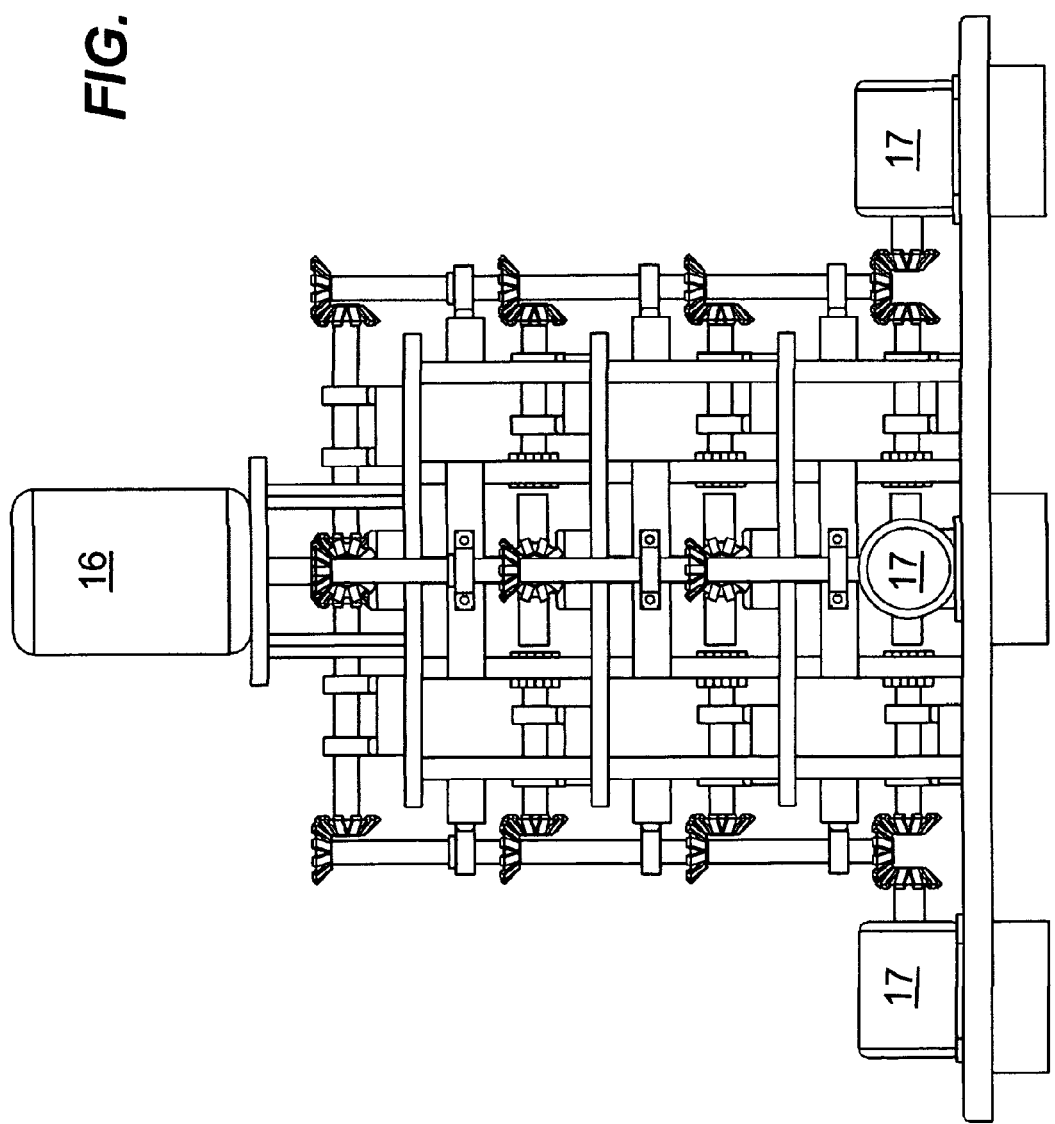
Figure 10C:
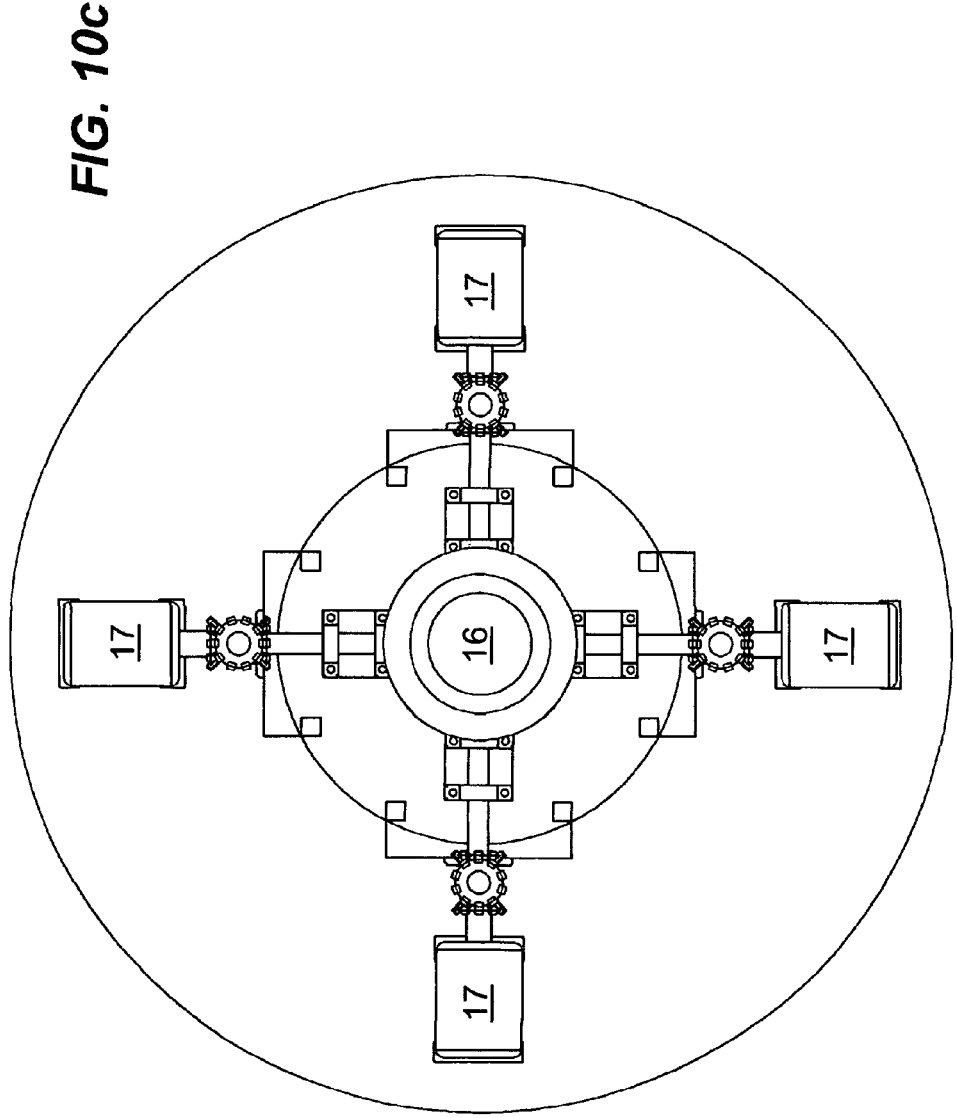

The invention can also be oriented horizontally, as shown in FIG. 9. And can even be stacked as shown in FIG. 10a-c.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A magnetic amplifier comprising a main disc having a plurality of
   permanent magnets embedded therein; an electric generator;
   a main disc shaft connected and passing through the center of said main disc and mechanically connected at an end thereof to said electric generator;
   at least one electric motor; an electric motor shaft mechanically connected to each of said at least one electric motor; an oblong permanent magnet attached to a distal end of each electric motor shaft opposite the end attached to said electric motor, wherein each of said oblong magnets are positioned in close proximity to the radial edge of said main disc to thereby interact with the permanent magnets of said main disc, wherein when said at least one electric motor rotates the respective oblong permanent magnets, the main disc is magnetically induced to rotate and thereby create electrical energy within said electric generator;
   a backup system including a beveled gear shaft for each said electric motor shaft;
   a beveled gear attached to an end of each of said beveled gear shafts;
   a beveled gear upon said main disc shaft in close proximity to said electric generator and adapted to mechanically interact with each beveled gear of each of said beveled gear shafts;
   a pulley concentric with and attached to each of said beveled gear shafts; a pulley concentric with and attached to each of said electric motor shafts;
   and a belt for each said electric motor shaft, each respective belt being frictionally connected between each respective beveled gear shaft pulley and electric motor shaft pulley, such that when said electric motors rotate, the respective belts, pulleys, and beveled gears rotate, thereby creating electrical energy within said electric generator.

2. The magnetic amplifier of claim 1, wherein said main disc is formed from non-magnetizable material.

3. The magnetic amplifier of claim 1, wherein said non-magnetizable material is chosen from a list of non-magnetizable material including wood, and polymers.

4. The magnetic amplifier of claim 1, wherein said oblong permanent magnets are formed from a plurality of stacked magnets.

5. The magnetic amplifier of claim 1, wherein the permanent magnets of said main disc consist of a set of permanent magnets having two alternating poles.

6. The magnetic amplifier of claim 1, wherein the permanent magnets of said main disc consist of a set of permanent magnets having four alternating poles.

7. The magnetic amplifier of claim 1, wherein there are four electric motors, four electric motor shafts, and four oblong permanent magnets around and interacting with said main disc.

* * * * *